United States Patent
Chanowitz (10) Patent No.: US 10,285,531 B2
(45) Date of Patent: May 14, 2019

(54) SLOW COOKER LID-MOUNTED WARMING DISH

(71) Applicant: Benson Chanowitz, Brooklyn, NY (US)

(72) Inventor: Benson Chanowitz, Brooklyn, NY (US)

( * ) Notice: Subject to any disclaimer, the term of this patent is extended or adjusted under 35 U.S.C. 154(b) by 258 days.

(21) Appl. No.: 15/530,598

(22) Filed: Feb. 6, 2017

(65) Prior Publication Data

US 2018/0220831 A1  Aug. 9, 2018

(51) Int. Cl.
*A47J 27/13* (2006.01)
*A47J 36/24* (2006.01)
*A47J 27/00* (2006.01)
*F27D 11/00* (2006.01)
*A47J 27/122* (2006.01)

(52) U.S. Cl.
CPC .............. *A47J 27/13* (2013.01); *A47J 36/24* (2013.01); *A47J 27/004* (2013.01); *A47J 27/122* (2013.01); *F27D 11/00* (2013.01)

(58) Field of Classification Search
CPC  A47J 27/12; A47J 27/122; A47J 27/13; A47J 47/14; A47J 37/0623; B65D 81/38
See application file for complete search history.

(56) References Cited

U.S. PATENT DOCUMENTS

| | | | |
|---|---|---|---|
| 2,346,631 A * | 4/1944 | Wille ...................... | A47J 47/02 126/381.1 |
| 2,582,735 A | 1/1952 | Alaj | |
| 2,990,287 A * | 6/1961 | Clarke .................... | A47J 39/02 206/508 |
| 3,557,774 A | 1/1971 | Kreis | |
| 3,734,077 A | 5/1973 | Murdough et al. | |
| 3,837,330 A | 9/1974 | Lanigan et al. | |
| 3,854,582 A * | 12/1974 | Martinelli ............... | A47J 27/12 99/339 |
| 4,246,884 A | 1/1981 | Vandas | |
| 4,844,263 A * | 7/1989 | Hadtke ................ | B65D 21/022 206/508 |
| 5,184,745 A * | 2/1993 | Havens .............. | B65D 43/0202 220/833 |
| 5,307,647 A * | 5/1994 | McClure ............ | B65D 81/3818 62/371 |
| 5,692,617 A * | 12/1997 | Adams ............... | B65D 81/3818 62/371 |
| 5,992,308 A * | 11/1999 | Kroscher ................ | A47J 47/02 126/381.1 |
| 6,199,699 B1 * | 3/2001 | Eastman .................. | A47J 47/14 206/541 |
| 7,100,498 B2 | 9/2006 | Morgan | |
| 8,444,001 B1 * | 5/2013 | Dawson ................. | A47G 19/06 206/217 |
| D742,224 S * | 11/2015 | Thurin .......................... | D7/629 |
| 2005/0051549 A1* | 3/2005 | Nelson ............... | B65D 21/0219 220/23.83 |

(Continued)

*Primary Examiner* — Christopher R Harmon (57) ABSTRACT

A warming dish for mounting atop a functioning slow cooker with a lid, which includes a main dish housing having at least one side wall and a bottom, wherein the bottom has a predetermined center and is dome-shaped rising toward the center, and wherein the bottom has an upwardly extending recess at the center to accommodate positioning over a lid handle of a slow cooker. The invention also includes the warming dish in combination with a slow cooker.

20 Claims, 6 Drawing Sheets

(56) References Cited

U.S. PATENT DOCUMENTS

| | | | |
|---|---|---|---|
| 2005/0145633 A1* | 7/2005 | Goto | A47J 36/06 220/573.4 |
| 2008/0169280 A1* | 7/2008 | Barnes | A47J 27/004 219/412 |
| 2009/0065509 A1* | 3/2009 | Schuler | A47F 10/06 186/49 |
| 2009/0294217 A1* | 12/2009 | Tanaka | A47F 10/06 186/49 |
| 2010/0001014 A1* | 1/2010 | Tabone | B65D 43/0202 220/833 |
| 2015/0257575 A1* | 9/2015 | Coblentz | A47J 27/12 99/339 |
| 2016/0324359 A1* | 11/2016 | Aboujassoum | A47J 36/00 |

* cited by examiner

SLOW COOKER LID-MOUNTED WARMING DISH

REFERENCE TO RELATED APPLICATIONS

The present application is not related to any pending or issued United States of America or foreign patent or patent application.

BACKGROUND OF INVENTION a. Field of Invention

Crock pots (generically used herein to refer to slow cookers, typically for slowly cooking meats, stews, casseroles and soups) have lids with dome-shapes and center handles on top of the lids. Likewise, other slow cookers, such as electric broilers, roasters, etc., as well as crock pots, are used to slow cook food. The present invention is directed to creating a surface-to-surface warming dish that nests on top of a lid-covered slow cooker. The present invention warming dish uniquely has a domed bottom with a recess for accommodating the lid handle of the slow cooker lid. These configurations enable most of the bottom surfaces to have direct contact with the tops of the slow cooker lids for efficient transfer of heat from the slow cooker lids to the present warming dishes. (Warming dishes, as used herein should be construed to include dishes, pans and similar names for warming foods.) By mounting the present invention warming dish(es) atop a slow cooker with the unique surface-to-surface contact to maximize heat transfer, these present invention dishes may be used to heat side dishes, breads, soups, warm desserts or any other edible that may be eaten with or separately from the contents of the slow cooker.

b. Description of Related Art

The following patents are representative of the field pertaining to the present invention:

U.S. Pat. No. 7,100,498 B2 to Morgan describes an apparatus assembly for forming a compound dessert in a predetermined compound ring shape including a first outer ring shaped pan defining a cavity, the cavity having a dome shaped cross section with a closed circular end, an open end and a centrally positioned funnel shaped support having an upper solid planar surface. A cover including a second dome ring shaped pan of a smaller width and depth and a surrounding circular skirt is mounted to the outer ring shaped pan with the second inner ring shaped pan extending into a cavity of the first outer ring shaped pan.

U.S. Pat. No. 4,246,884 to Vandas describes a plate warmer having a heat storing core material for releasing heat to food serving supported thereon dishware over an extended period of time, i.e., in excess of thirty minutes, and a method of making said plate warmer. The heat storing material comprises beads of synthetic petroleum wax which are compressed to form a solid core having inwardly concave top and bottom surfaces and to expel air from the core. Top and bottom outer plate members are compressed to conform to the inwardly concave surfaces of the core and then sealed to define an airtight, waterproof cavity which is filled by the core. When the plate wanner is heated, the core expands outwardly against the concave walls of the outer plate members and the walls assume a substantially flat configuration wherein the cavity is enlarged to accommodate the expanded core material, the walls reassuming their inwardly concave configuration as the heat storing core material cools and releases heat through the top outer plate member to the dishware.

U.S. Pat. No. 3,837,330 to Lanigan et al. describes a hollow food serving dish having upper and lower metal shells with a rigid heat-retaining member disposed therebetween. The shells are imperforate and are hermetically sealed together along their peripheral edges. Limited expansion is permitted upon heating, but the danger of bursting is avoided because of the secure interconnection between the upper shell and the rigid member and because of the interfitting relationship between the rigid member and the bottom shell with its concave configuration and peripheral shoulder.

U.S. Pat. No. 3,734,077 to Murdough et al. describes a hollow food serving dish having upper and lower metal shells with a heat-retaining pellet and a resilient cushioning element disposed therebetween. The shells are generally rectangular in shape, when viewed in elevation, and are hermetically sealed together only at their peripheral edges. Limited expansion is permitted upon heating, but the danger of bursting is avoided by reason of the configuration and construction of the dish.

U.S. Pat. No. 3,557,774 to Kreis describes a heat storage dish, such dish providing the advantages of not bursting apart as a result of excessive heating and increased interior pressure, and further complying with maximum hygienic requirements. The novel heat storage dish generally is constructed to have a heat storage plate disposed in the bottom thereof between an interior wall and an exterior wall forming an enclosed cavity or space. The novel storage dish is characterized by the feature that the heat storage plate is retained in position in such a manner that it abuts the interior wall of the dish and further defines an opening in the central area thereof. Both of the walls of the dish are connected to one another through the opening in the interior of the heat storage plate as well as on the outside or rim portion exterior of the plate. The bottom portion of the exterior wall of the heat storage dish has an annular deformable section which is upwardly displaced relative to the support plane of the dish itself, this section being delimited by two reinforced zones located between the walls within the interior and exterior points of connection.

U.S. Pat. No. 2,582,735 to Alaj describes a hot dish container comprising a member formed with a flared side wall upon the upper edge of which the rim of a dish is adapted to seat, and upwardly extending flange carried by the side wall within which the dish loosely engages, the member having a bottom wall, the bottom wall having an upwardly offset central wall portion, a relatively thin closed housing within the member spaced from the flared side walls and seated on the central wall portion, heat insulating means in the housing, the housing and insulation being removable as a unit, a depending annular flange carried by the housing engaging about the offset central portion to thereby hold the housing concentric to the member and spaced from the flared side wall, a downwardly offset recess formed in the top wall of the housing, and a disc-shaped heat retaining element in the recess and projecting above the top wall of the housing for close heat exchange relation with the bottom of a dish seated on the side wall, the combined closed housing and heat retaining element being of a height no greater than substantially half that of the flared side wall.

Notwithstanding the prior art, the present invention is neither taught nor rendered obvious thereby.

SUMMARY OF INVENTION

The present invention is directed to a warming dish for mounting atop a functioning slow cooker with a lid, which comprises a main dish housing having at least one side wall and a bottom, wherein the bottom has a predetermined center and is dome-shaped rising toward the center, and wherein the bottom has an upwardly extending recess at the center to accommodate positioning over a lid handle of a slow cooker.

In some embodiments of the present invention warming dish, the at least one side wall is a circular shaped side wall from a top footprint view.

In some embodiments of the present invention warming dish, the recess is a circular recess to accommodate positioning over a round lid handle of a slow cooker.

In some embodiments of the present invention warming dish, the recess is an elongated recess to accommodate positioning over an elongated lid handle of a slow cooker.

In some embodiments of the present invention warming dish, the recess is an elongated recess that further includes two opposing, partially circular recess section to accommodate positioning over both a round lid handle of a slow cooker and to accommodate positioning over an elongated lid handle of a slow cooker.

In some embodiments of the present invention warming dish, there further includes side handles.

In some embodiments of the present invention warming dish, there further includes a lid.

In some embodiments of the present invention warming dish, the lid is dome-shaped with a center lid handle.

In some embodiments of the present invention warming dish, the dome-shaped lid has the same profile as the dome-shaped bottom of the warming dish.

In some embodiments of the present invention warming dish, the warming dish is a first warming dish and which further includes a second warming dish nesting atop the first warming dish, and having a main dish housing having at least one side wall and a bottom, wherein the bottom has a predetermined center and is dome-shaped rising toward the center, and wherein the bottom has an upwardly extending recess at the center to accommodate positioning over a lid handle of a slow cooker and nesting atop the first warming dish.

In some embodiments of the present invention warming dish, there is a warming dish and a slow cooker, which includes a) a slow cooker; and, b) a warming dish wherein the warming dish is mounted atop the functioning slow cooker with a lid, wherein the warming dish includes a main dish housing having at least one side wall and a bottom, wherein the bottom has a predetermined center and is dome-shaped rising toward the center, and wherein the bottom has an upwardly extending recess at the center to accommodate positioning over a lid handle of a slow cooker.

In some embodiments of the present invention warming dish and a slow cooker, the at least one side wall of the warming dish is a circular shaped side wall from a top footprint view.

In some embodiments of the present invention warming dish and a slow cooker, the recess of the bottom of the warming dish is a circular recess to accommodate positioning over a round lid handle of a slow cooker.

In some embodiments of the present invention warming dish and a slow cooker, the recess of the bottom of the warming dish is an elongated recess to accommodate positioning over an elongated lid handle of a slow cooker.

In some embodiments of the present invention warming dish and a slow cooker, the recess of the bottom of the warming dish is an elongated recess that further includes two opposing, partially circular recess section to accommodate positioning over both a round lid handle of a slow cooker and to accommodate positioning over an elongated lid handle of a slow cooker.

In some embodiments of the present invention warming dish and a slow cooker, the warming dish further includes side handles.

In some embodiments of the present invention warming dish and a slow cooker, the warming dish further includes a lid.

In some embodiments of the present invention warming dish and a slow cooker, the warming dish lid is dome-shaped with a center lid handle.

In some embodiments of the present invention warming dish and a slow cooker, the warming dish dome-shaped lid has the same profile as the dome-shaped bottom of the warming dish.

In some embodiments of the present invention warming dish and a slow cooker, the warming dish is a first warming dish and which further includes a second warming dish nesting atop the first warming dish, and having a main dish housing having at least one side wall and a bottom, wherein the bottom has a predetermined center and is dome-shaped rising toward the center, and wherein the bottom has an upwardly extending recess at the center to accommodate positioning over a lid handle of a slow cooker and nesting atop the first warming dish.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE SEVERAL VIEWS OF THE DRAWINGS(S)

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

The present invention warming dish is specifically created to have surface-to-surface contact with domed lids and includes an upwardly extending recess in its domed bottom to accomplish this. The warming dishes may be permanent structures or disposable structures and may be made of any material or combination of materials that accommodate heat transfer and are safe for warming dishes. These materials include certain plastics, glassware, ceramics, porcelain, cermets and metals. Highly conductive metals are preferred in some embodiments and, in the case of disposable present invention warming dishes, molded metal foils and heat resistant, biodegradable materials are preferred. The content of the present invention warming dishes is very broad based and may be any edible commodity. Additionally, the present invention warming dishes are not only placed on a slow cooker lid, but may as well or separately be stacked, such as on a warming plate. In Jewish traditions, during certain holy days, only certain foods may be eaten and can only be slow cooked according to religious directives. The present invention warming dishes are particularly useful, therefore in preparing Jewish holy day foods that may be warmed atop a slow cooker and could thus be used for Kosher soups or other Kosher foods.

Figure 1:
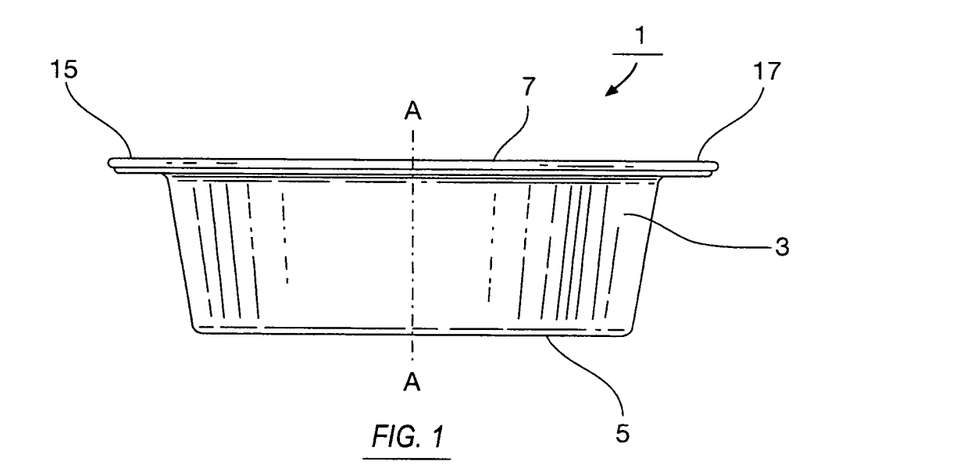
FIG. 1 shows a front view of one embodiment of a present invention slow cooker lid-mounted warming dish.
Figure 2:
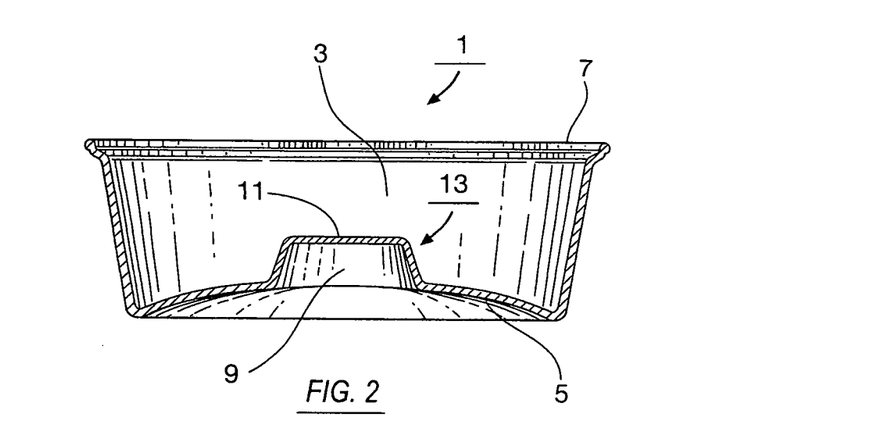
FIG. 2 shows a side cut view of the same present invention slow cooker lid-mounted warming dish.
Figure 3:
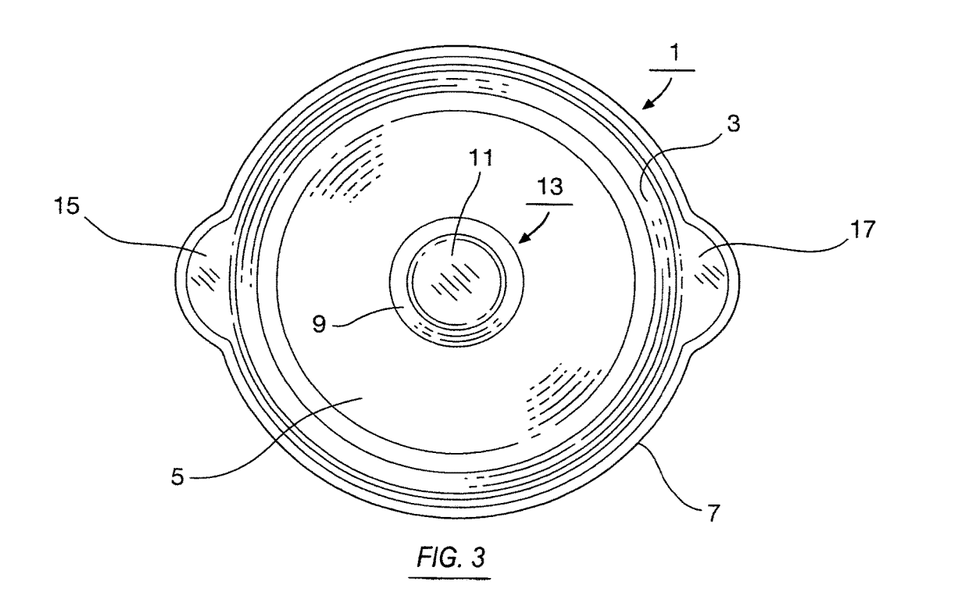
FIG. 3 shows a top view of the same present invention slow cooker lid-mounted warming dish.
Figure 4:
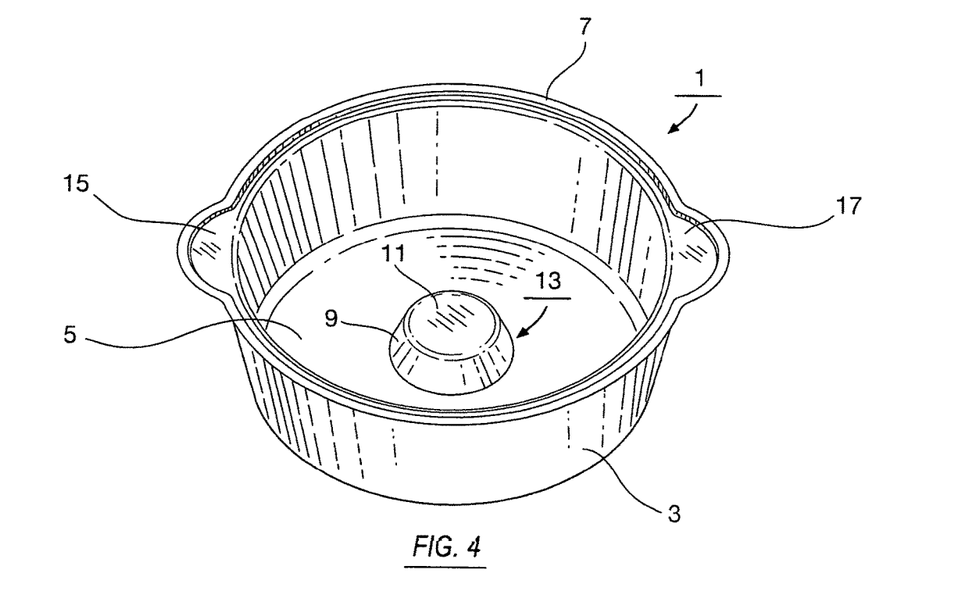
FIG. 4 shows an oblique view thereof, wherein the bottom recess in these figures is adapted to fit over a circular handle of a lid.

FIG. 1 shows a front view of one embodiment of a present invention slow cooker lid-mounted warming dish 1. Dish 1 includes a round side wall 3 and a domed bottom 5 with an open top rim 7 and handles 15 and 17. FIG. 2 shows a side cut view of the same present invention slow cooker lid-mounted warming dish 1. This is a cut side view along cut lines A-A of FIG. 1. It can now be seen that bottom 5 is domed and has an upwardly extending recess 13 with a recess side wall 9 and a recess top 11. It is essential that this recess be solid, meaning that it has no orifices or holes like a Bundt cake pan. This is necessary to prevent leakage of liquids and exposure of other foods in the present invention warming dish. FIG. 3 shows a top view of the same present invention slow cooker lid-mounted warming dish 1, and FIG. 4 shows an oblique view thereof, wherein the bottom recess in these figures is adapted to fit over a circular handle of a lid. Note that identical components are identically numbered in all of these features. This embodiment present invention warming dish 1 will nest atop any slow cooker with a domed lid having a handle that is round or any shape but small enough to fit into recess 13.

Figure 5:
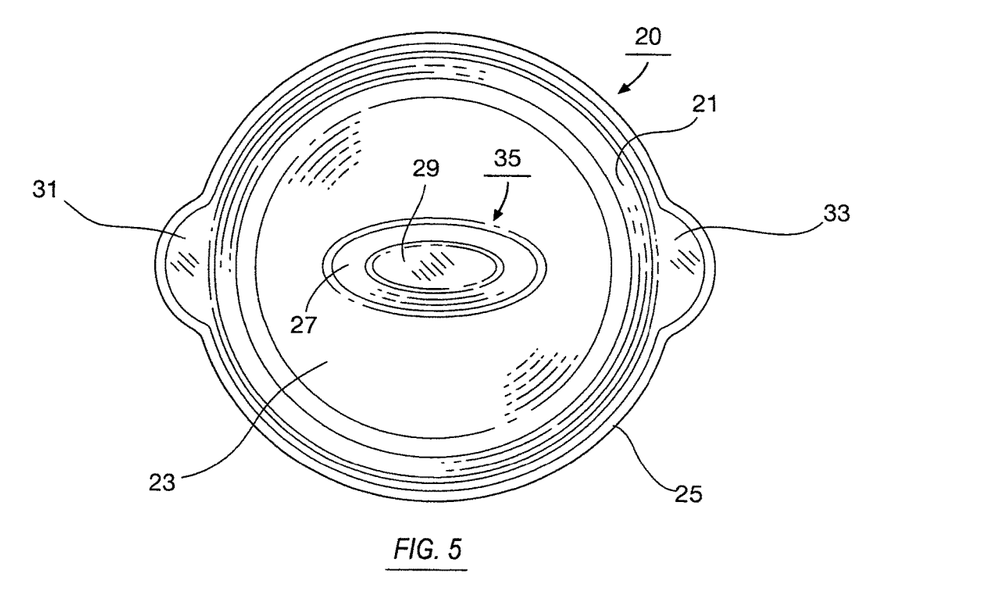
FIG. 5 shows a top view of an alternative embodiment present invention slow cooker lid-mounted warming dish and FIG. 6 shows a cut side view thereof, wherein the bottom recess is adapted to fit over an elongated handle of a lid.
Figure 6:
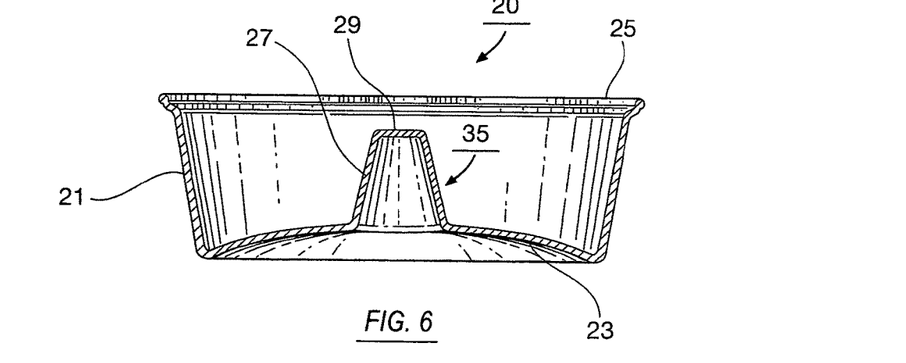

FIG. 5 shows a top view of an alternative embodiment present invention slow cooker lid-mounted warming dish 20. Dish 20 includes a round side wall 21 and a domed bottom 23 with an open top rim 25 and handles 31 and 33. FIG. 6 shows a side cut view of the same present invention slow cooker lid-mounted warming dish 20. It can now be seen that bottom 23 is domed and has an upwardly extending recess 35 with a recess side wall 27 and a recess top 29. Upwardly extending recess 35 is elongated and thus is adapted to fit over an elongated handle of a slow cooker domed lid.

Figure 7:
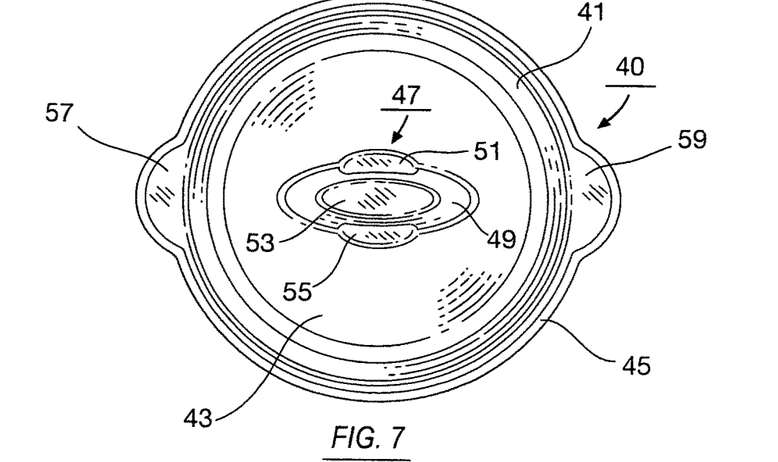
FIG. 7 shows a top view of another alternative embodiment present invention slow cooker lid-mounted warming dish and FIG. 8 shows a cut side view thereof.
Figure 8:
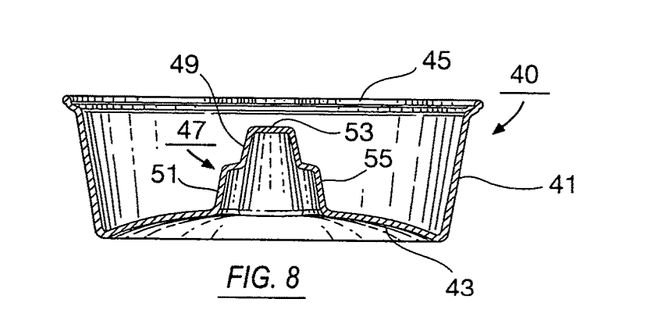
Figure 9:
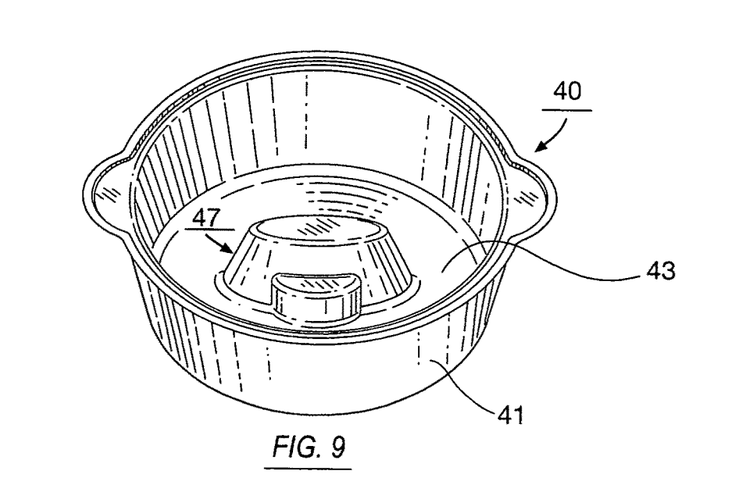
FIG. 9 shows an oblique view thereof, wherein the bottom recess is a universal recess adapted to fit over both an elongated handle, and, alternatively, a circular handle or other shaped handle of a lid.

FIG. 7 shows a top view of another alternative embodiment present invention slow cooker lid-mounted warming dish 40. Dish 40 includes a round side wall 41 and a domed bottom 43 with an open top rim 45 and handles 57 and 59. FIG. 8 shows a side cut view of the same present invention slow cooker lid-mounted warming dish 40. It can now be seen that bottom 43 is domed and has an upwardly extending recess 47. This recess 47 is a universal recess and thus has a portion that is elongated and a portion that is circular. Specifically, upwardly extending recess 47 has an elongated side wall 49 (oval) and an elongated top 53. At right angles thereto are semi-circular portions such as arcuate side wall 51 and arcuate top 55. FIG. 9 shows an oblique view of present invention warming dish 40, wherein the bottom recess is a universal recess adapted to fit over both an elongated handle, and, alternatively, a circular handle, or any other shaped handle of a lid that will fit into recess 47.

Figure 10:
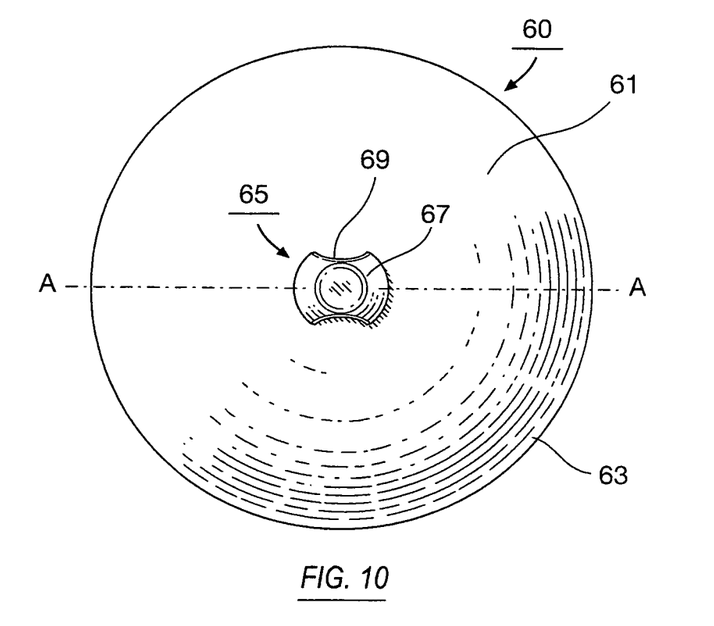
FIGS. 10 and 11 show a top view and a cut front view of a lid that may be used with present invention slow cooker lid-mounted warming dish.
Figure 11:
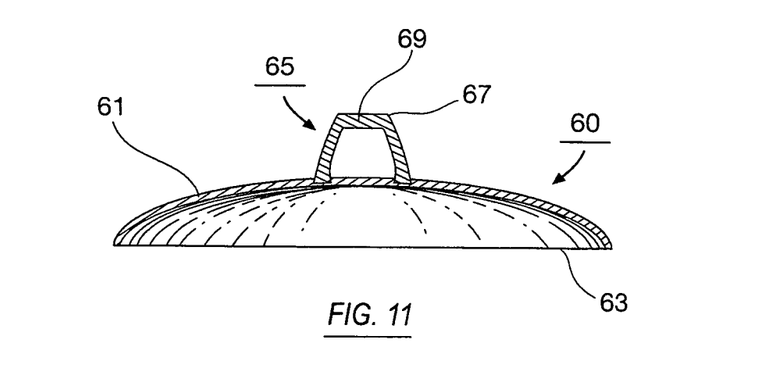

FIGS. 10 and 11 show a top view and a cut front view, respectively, of a lid 60 that may be used with present invention slow cooker lid-mounted warming dish. Lid 60 has a top domed surface 61, a rim 63 adapted to fit onto or into a rim of a present invention warming dish. It also has a top handle 65 that has a circular section 67 with finger grips such as finger grip 69.

Figure 12:
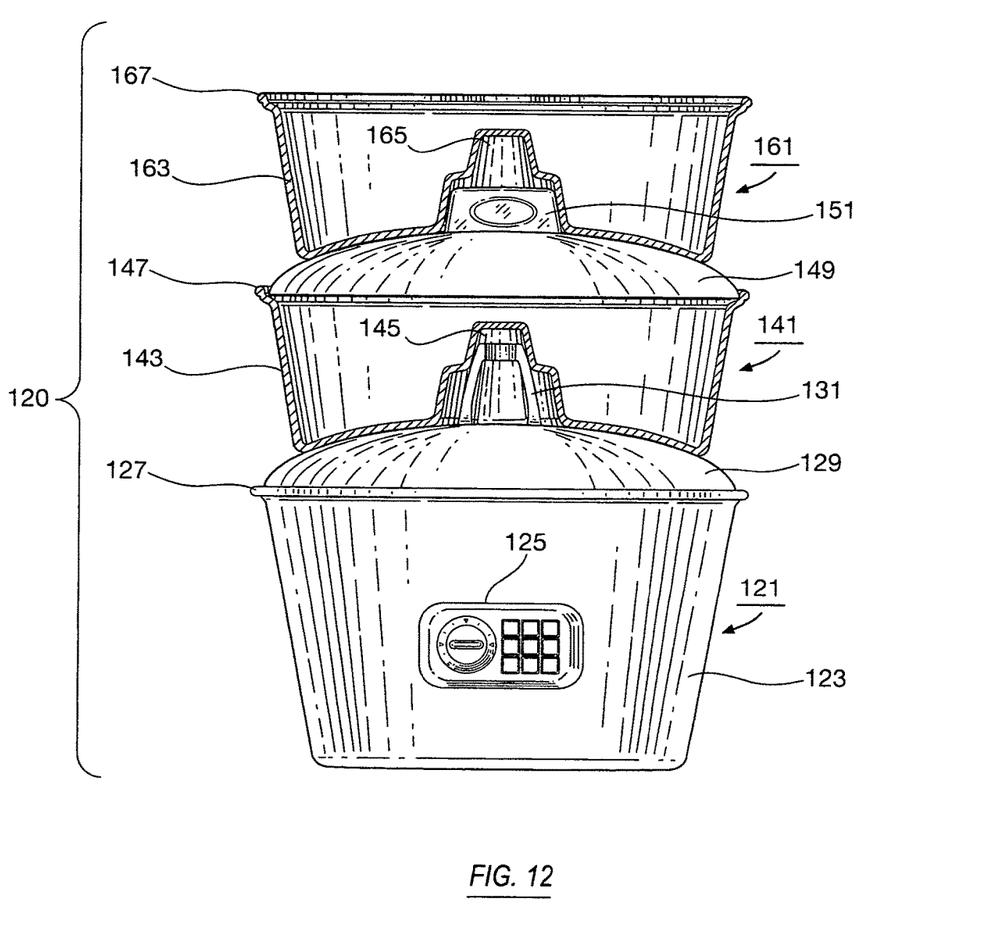
FIG. 12 shows a partially cut view of a slow cooker with a lid and two mounted present invention slow cooker lid-mounted warming dishes one atop the slow cooker and the other atop a present invention warming dish, each of these warming dishes having universal handle-receiving recesses.

FIG. 12 shows a partially cut view of a present invention system 120 utilizing a slow cooker 121 with a lid 129 and two mounted present invention slow cooker lid-mounted warming dishes 141 and 161. As can be seen in FIG. 12, the slow cooker 141 is nested atop slow cooker 121 and present invention warming dish 141 has a lid 149. Present invention warming dish 161 is open and nests atop present invention warming dish 141. Each of these warming dishes 141 and 161 has universal handle-receiving recesses 145 and 165, respectively. Slow cooker 121 has external controls 125 on its side wall 123 and has its lid 129 positioned in rim 127, as shown. Present invention warming dish 141 has a side wall 143 with a domed bottom and top rim 147. Likewise, present invention warming dish 161 has a side wall 163 and a domed bottom with recess 165. It has a lid receiving rim 167 that is shown open but may itself have a lid. Although two present invention warming dishes are shown stacked in FIG. 12, more than two may be stacked, as desired.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. For example, the actual shape of the main housing may be any of numerous possibilities as long as its functionality as described is not affected adversely.

What is claimed is:

1. A warming dish and a slow cooker, which comprises:
   a) a slow cooker; and,
   b) a warming dish wherein said warming dish is mounted atop said functioning slow cooker with a lid, wherein said warming dish includes a main dish housing having at least one side wall and a bottom, wherein said bottom has a predetermined center and is dome-shaped rising toward said center, and wherein said bottom has an upwardly extending recess at said center to accommodate positioning over a lid handle of a slow cooker.

2. The warming dish and a slow cooker of claim 1 wherein said at least one side wall of said warming dish is a circular shaped side wall from a top footprint view.

3. The warming dish and a slow cooker of claim 1 wherein said recess of said bottom of said warming dish is a circular recess to accommodate positioning over a round lid handle of a slow cooker.

4. The warming dish and a slow cooker of claim 1 wherein said recess of said bottom of said warming dish is an elongated recess to accommodate positioning over an elongated lid handle of a slow cooker.

5. The warming dish and a slow cooker of claim 1 wherein said recess of said bottom of said warming dish is an elongated recess that further includes two opposing, partially circular recess section to accommodate positioning over both a round lid handle of a slow cooker and to accommodate positioning over an elongated lid handle of a slow cooker.

6. The warming dish and a slow cooker of claim 1 wherein said warming dish further includes side handles.

7. The warming dish and a slow cooker of claim 1 wherein said warming dish further includes a lid.

8. The warming dish and a slow cooker of claim 7 wherein said warming dish lid is dome-shaped with a center lid handle.

9. The warming dish and a slow cooker of claim 8 wherein said warming dish dome-shaped lid has the same profile as the dome-shaped bottom of said warming dish.

10. A warming dish for mounting atop a functioning slow cooker with a lid, which comprises:
   a main dish housing having at least one side wall and a bottom, wherein said bottom has a predetermined center and is dome-shaped rising toward said center, and wherein said bottom has an upwardly extending recess at said center to accommodate positioning over a lid handle of a slow cooker, wherein said recess is an elongated recess that further includes two opposing, partially circular recess section to accommodate positioning over both a round lid handle of a slow cooker and to accommodate positioning over an elongated lid handle of a slow cooker.

11. The warming dish of claim 10 wherein said at least one side wall is a circular shaped side wall from a top footprint view.

12. The warming dish of claim 10 wherein said warming dish further includes side handles.

13. The warming dish of claim 10 wherein said warming dish further includes a lid.

14. The warming dish of claim 13 wherein said lid is dome-shaped and said dome-shaped lid has the same profile as the dome-shaped bottom of said warming dish.

15. A system of warming dishes comprising: a plurality of stackable warming dishes, including at least a first warming dish and a second warming dish nesting atop said first warming dish, each of said first and second warming dishes having a main dish housing having at least one side wall and a bottom, wherein said bottom has a predetermined center and is dome-shaped rising toward said center, and wherein said bottom has an upwardly extending recess at said center to accommodate positioning over a lid handle of a slow cooker, wherein said recess is an elongated recess that further includes two opposing, partially circular recess section to accommodate positioning over both a round lid handle of a slow cooker and to accommodate positioning over an elongated lid handle of a slow cooker.

16. The system of warming dishes of claim 15 wherein said at least one side wall is a circular shaped side wall from a top footprint view.

17. The system of warming dishes of claim 15 wherein each of said first and second warming dishes further includes side handles.

18. The system of warming dishes of claim 15 wherein each of said first and second warming dishes further includes a lid.

19. The system of warming dishes of claim 18 wherein said lid is dome-shaped with a center lid handle.

20. The system of warming dishes of claim 19 wherein said dome-shaped lid has the same profile as the dome-shaped bottom of said warming dish.

\* \* \* \* \*